United States Patent [19]

Chako

[11] 4,004,144
[45] Jan. 18, 1977

[54] FLUORESCENT LIGHT UNIT

[75] Inventor: Andre L. Chako, Lancaster, Calif.

[73] Assignee: A and M Whitemetal Casting, Inc., Lancaster, Calif.

[22] Filed: Aug. 22, 1975

[21] Appl. No.: 606,858

[52] U.S. Cl. .................... 240/51.11 R; 240/47; 240/73 R; 240/78 R

[51] Int. Cl.$^2$ ...................................... H05B 33/02

[58] Field of Search ............ 240/51.11 R, 47, 73 R, 240/78 R, 81 R

[56] References Cited

UNITED STATES PATENTS

| | | | |
|---|---|---|---|
| 2,267,145 | 12/1941 | Strong | 240/51.11 R |
| 2,293,924 | 8/1942 | Swanson | 240/51.11 R |
| 2,323,172 | 6/1943 | Whittaker | 240/51.11 R |
| 2,364,854 | 4/1946 | Kallman | 240/51.11 R |
| 2,641,687 | 6/1953 | Akely | 240/47 X |
| 3,141,620 | 7/1964 | Guggemos | 240/47 X |

*Primary Examiner*—R. L. Moses
*Attorney, Agent, or Firm*—William P. Green

[57] ABSTRACT

A fluorescent light unit which is adapted for use in a conventional table lamp, hanging fixture, or wall fixture, and which includes a centerpost structure with a tube disposed about the centerpost and a plurality of fluorescent lamps at circularly spaced locations about the tube, and with the centerpost structure including or carrying a ballast unit for the lamps. The lamps and tube are mounted by top and bottom structures which are connected to the centerpost structure and which are constructed to pass an updraft of air through these structures and through the tube and about the ballast to cool the latter.

17 Claims, 9 Drawing Figures

FLUORESCENT LIGHT UNIT

BACKGROUND OF THE INVENTION

This invention relates to improved fluorescent light units of a type adapted to be utilized in substitution for a conventional incandescent light assembly in a table lamp, floor lamp, hanging fixture, wall light, or other fixture in which incandescent bulbs are normally used.

Though there have been various proposals in prior patents for table lamps or standing lamps utilizing fluorescent tubes or other tubular light elements, such as for example the arrangements shown in U.S. Pat. Nos. 2,267,145, 2,364,854, 2,323,172, 3,230,360, 2,293,924, 2,645,709 and 1,084,362, none of these proposals has to my knowledge enjoyed wide scale commercial success, and as a result it is still conventional to employ primarily standard incandescent bulb arrangements for these purposes. This is true in spite of the fact that fluorescent elements are admittedly far more efficient in operation than incandescent bulbs, and therefore cost much less to operate.

SUMMARY OF THE INVENTION

The present invention provides a unique light unit which is entirely self-contained, and which can very easily be connected into most table lamps as well as many other lamps and fixtures with very little difficulty and in a very short period of time. In most lamps, the alteration can be effected by merely removing the socket for the incandescent bulb of the lamp, and attaching the fluorescent unit to the lamp base by the same threads which initially connected the incandescent bulb socket. The shade of the lamp can then be attached to the upper portion of the unit by the same type of finial ordinarily employed to secure the shade to the harp of an incandescent type lamp. Further, the unit contains its own electrical ballast element for the fluorescent tubes, with this ballast being positioned at a location to be out of sight, but at the same time be exposed to a circulation of cooling air for maintaining the ballast in a cooled condition in use.

Structurally, a fluorescent light unit embodying the invention includes a centerpost structure which may be connectable at its lower end to a lamp base and at its upper end to a shade and finial, with a tube disposed about that centerpost in spaced relation, and with a plurality of fluorescent bulbs at the outside of the mentioned tube and at circularly spaced locations thereabout. The tube and fluorescent lamps are mounted to the centerpost by two top and bottom mounting structures, which are connected to the centerpost and extend laterally therefrom. The ballast for the fluorescent lamps is carried by or forms a portion of the centerpost structure, with an air circulation space being provided about the ballast and centerpost and between it and the surrounding tube, and with the discussed top and bottom mounting structures being constructed to be open to the flow of air upwardly therethrough, so that a continuous updraft path is provided through which air may pass upwardly first past the bottom mounting structure, then through the space between the centerpost and surrounding tube and about the ballast unit to cool it, and then upwardly past or through the top mounting structure to the atmosphere.

The top and bottom structures may each include a bracket connected at its center to the centerpost structure and having arms projecting laterally therefrom, with certain of the arms carrying sockets for mounting the fluorescent bulbs, and with others of the arms being engageable with the mentioned tube to hold it in place. This tube may be further located by engagement with vertically turned portions of the lamp sockets positioned to contact the inner surface of the tube near its ends.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENTS

Figures 1, 3, 4, 5:
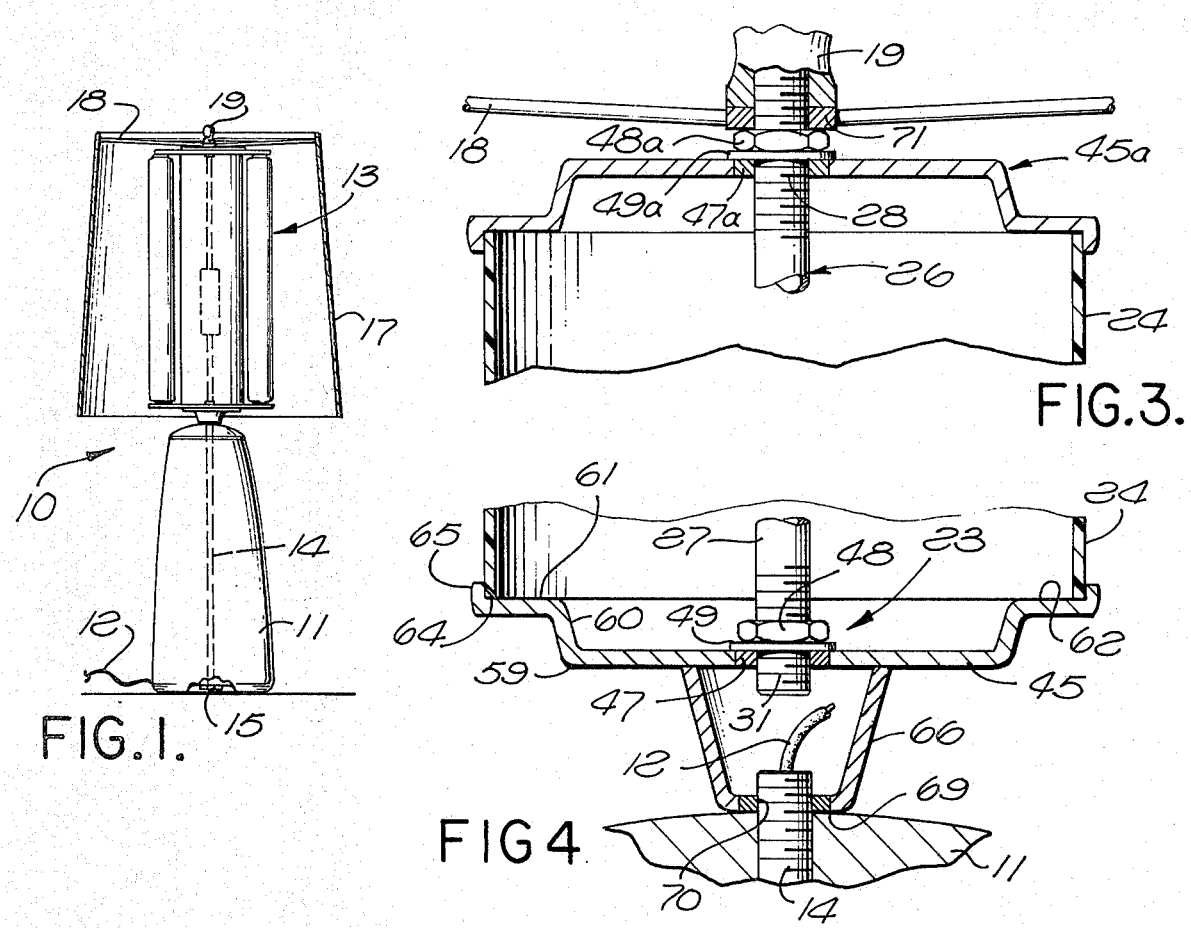
FIG. 1 shows a light unit embodying the invention as utilized in a table lamp, with some of the parts being shown in vertical section and others being shown in elevation.
FIGS. 3 and 4 are fragmentary vertical sections taken on lines 3—3 and 4—4 respectively of FIG. 2.
FIG. 5 is a horizontal section taken on line 5—5 of FIG. 2.

FIG. 1 illustrates at 10 a table lamp having a base 11 which may be of any desired configuration, with electricity being supplied to the lamp by a cord 12 which extends upwardly through the interior of the base and connects to and energizes a fluorescent light unit 13 constructed in accordance with the invention. In accordance with conventional practice, the base contains a tube 14 whose lower end is connected to a nut 15 bearing upwardly against the bottom of the base and whose upper end is threaded externally at 16 (see FIG. 2). In the usual incandescent bulb arrangement, the socket for the incandescent bulb is connected threadedly onto this upper end portion 16 of tube 14, and tightened downwardly against the top of the base 11 to secure all of the parts together. In the present altered arrangement, the socket has been removed from the upper end of tube 14, and in its place the fluorescent assembly 13 has been connected onto the same tube 14 and tightened downwardly against the base to again secure the parts together. A lamp shade 17 has its upper mounting portion 18 connected to the top of unit 13 by the same finial 19 which would ordinarily secure the shade to the harp of a fluorescent arrangement, with the shade extending downwardly about the fluorescent assembly as shown.

Figure 2:
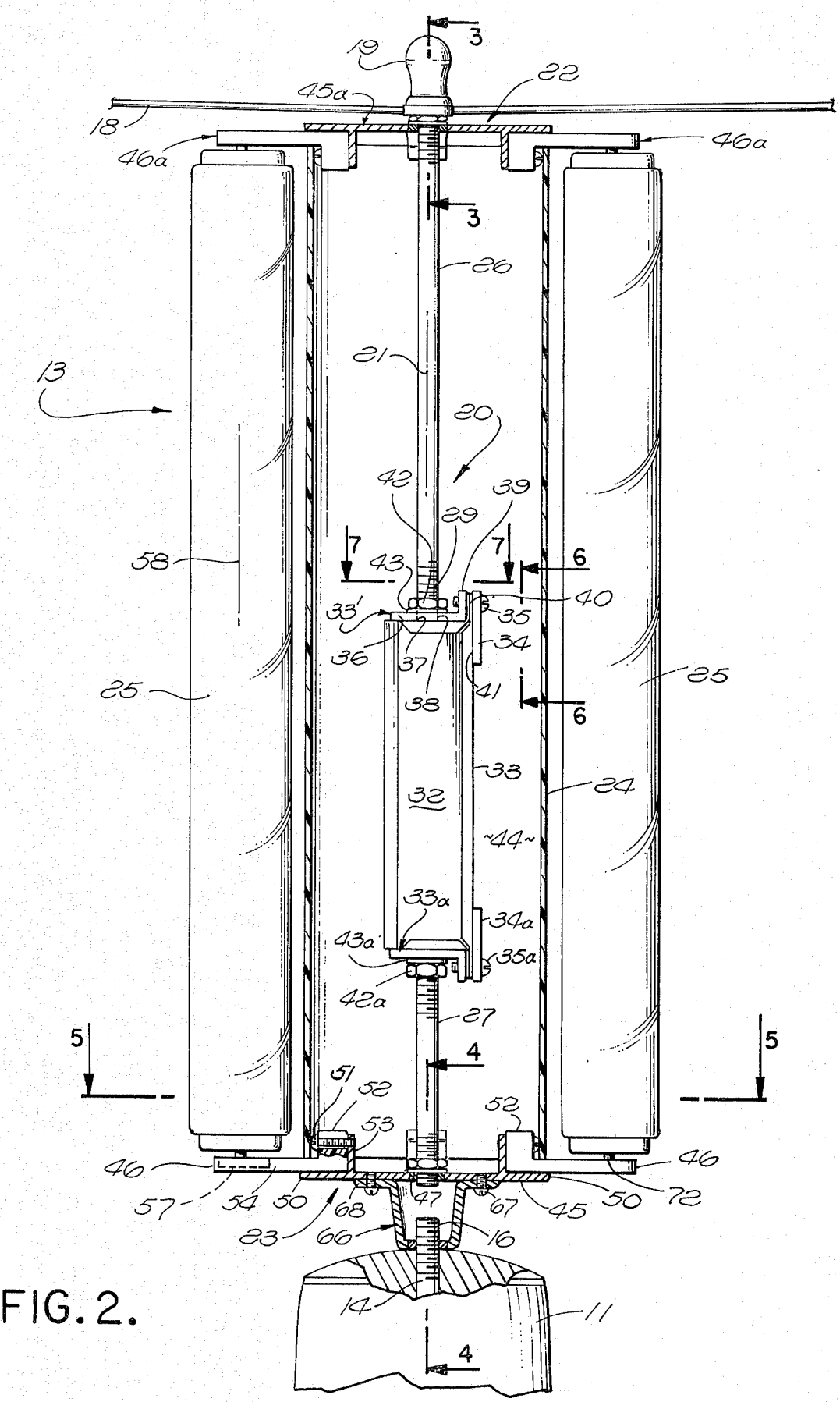
FIG. 2 is an enlarged view similar to FIG. 1, but with more of the parts shown in vertical section to better reveal their construction and interrelationship.
Figure 6:
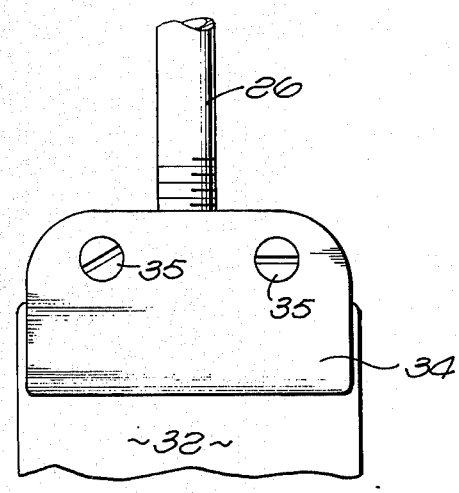
FIGS. 6 and 7 are fragmentary sections taken on lines 6—6 and 7—7 respectively of FIG. 2.
Figure 7:
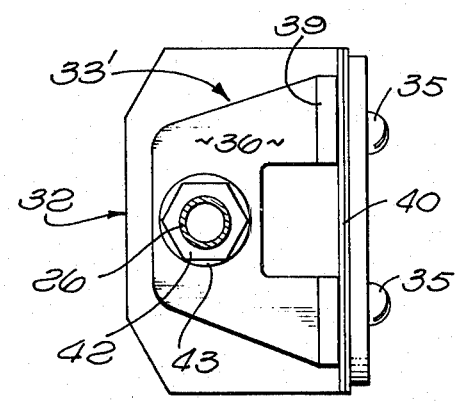

As is best seen in FIG. 2, the fluorescent unit or assembly 13 includes a rigid centerpost structure 20 which extends upwardly at the center of the device and along the central vertical axis 21 of the lamp. At its upper and lower ends, this centerpost structure 20 is connected to a top structure 22 and a bottom structure 23 which serve to mount a tube 24 disposed about the centerpost and a plurality a fluorescent lamps or bulbs 25.

The centerpost structure 20 includes two aligned rigid vertical upper and lower tubes 26 and 27, both centered about the previously mentioned axis 21, and both of the standard nominal ⅜ inch diameter conventionally utilized in electrical lamps and fixtures. At their upper and lower ends, these tubes have standard nominal ⅜ inch electrical threads of the same size and type as those provided at the upper end of tube 14 and those provided internally within finial 19. Vertically between the two tubes 26 and 27, the centerpost structure includes a standard fluorescent lamp electrical ballast unit 32, which includes a rigid outer housing 33 containing the electrical parts of the ballast. This ballast unit is connected rigidly at its upper end to tube 26 and at its lower end to tube 27, to serve as a part of the structure of the centerpost, so that the two tubes 26 and 27 are connected together only by the ballast unit. Preferably, the lower end of tube 26 is connected to ballast 32 by a rigid bracket 33' and a plate 34 secured together by a pair of screws 35. Bracket 33' has a horizontal planar portion 36 resting against the upper horizontal surface 37 of the essentially rectangular ballast unit 32, and containing an opening having internal threads 38 into which the lower threaded end 29 of tube 26 is connectable to secure the parts together. At its right side as viewed in FIG. 2, the angle iron shaped bracket 33' has a portion 39 turned vertically upwardly and received against an upwardly projecting rigid planar mounting tab 40 of the ballast unit, with plate 34 being received at the right side of tab 40 and extending downwardly to engage the upper portion of the vertical side surface of the ballast at 41. Screws 35 extend through registering openings in flange 39, tab 40 and plate 34, to tightly clamp tab 40 between the other two elements and thereby rigidly secure tube 26 and ballast 32 together. A nut 42 and lock washer 43 may be disposed about tube 26 above portion 36 of bracket 33', and be tightened downwardly against that portion 36 to lock tube 26 against detachment from the bracket.

The lower tube 27 is connected to the lower end of ballast 32 by a second bracket 33a, and associated plate 34a, pair of screws 35a, nut 42a and lock washer 43a, co-acting with a downwardly projecting tab or flange 40a of ballast unit 32a, and all corresponding to though inverted with respect to elements 33', 34, 35, 40, 42 and 43 respectively at the upper end of the ballast. Thus, the elements 26, 27 and 32 form together a rigid vertical structure centered about axis 21 and forming a support for the rest of the structure of the unit.

The tube 24 is desirably of straight cylindrical configuration, and centered about axis 21 and the centerpost structure 20, in radially spaced relation to the centerpost to provide an essentially annular vertical airflow passage 44 about the centerpost and its ballast portion through which cooling air may flow upwardly to carry away heat produced by the ballast. Tube 24 may be formed of an opaque or translucent material, preferably an appropriate rigid translucent resinous plastic substance.

As seen best in FIGS. 4 and 5, the bottom mounting structure 23 includes a rigid typically metal bracket 45 extending essentially horizontally and carrying at diametrically opposite locations two upwardly facing electrical sockets 46 to which the lower ends of fluorescent tubes 25 are detachably connectable in energizing relation. At its center, bracket 45 rigidly carries an internally threaded insert 47 into which the lower threaded end 31 of tube 27 is connectable, with a lock nut 48 and lock washer 49 being tightenable downwardly against bracket 45 and/or its carried insert to lock the bracket in fixed position relative to tube 27.

Bracket 45 has a first pair of arms 50 (FIGS. 2 and 5) projecting in diametrically opposite directions with respect to axis 21, and to which the insulative bodies of the sockets are rigidly connected by screws 51 extending through upstanding portions 52 of those insulative bodies and threadedly connected into vertical flanges 53 carried by arms 50, with the horizontal main portions 54 of the insulative bodies of the sockets resting downwardly against the upper surfaces of terminal portions 55 of arms 50, as seen clearly in FIG. 2. The two socket elements are thus so located that the corners 56 of their upwardly extending portions 52 are engageable with the inner surface of the lower portion of tube 24, at essentially diametrically opposite locations as seen in FIG. 5, to assist in locating and centering the tube relative to the centerpost structure. As will be understood, each of the radially outwardly projecting horizontal portions 54 of the socket elements contains electrical contacts diagrammatically represented at 57 in FIG. 2, constructed in conventional manner so that the fluorescent tubes 25 can be connected electrically thereto and mounted thereby by merely sliding the fluorescent tubes toward axis 21 and then turning each of the tubes about its vertical axis 58 when properly positioned as in FIG. 2 to connect the tube mechanically and electrically to the sockets at both of its ends.

Referring again to FIG. 5, bracket 45 has also a second pair of arms 59 projecting in diametrically opposite locations with respect to axis 21, at locations offset 90° from or perpendicular with respect to arms 50. Each of these arms 59 near its end extends first upwardly at 60 and then laterally outwardly at 61 to form an upwardly facing essentially horizontal surface 62 in the same horizontal plane as upper surfaces 63 of the sockets, so that the lower horizontal edge 64 of tube 24 can rest on surfaces 62 and 63 in supported relation. Also, outwardly beyond the tube, each of the arms 59 has an upwardly turned extremity or lug 65 which engages the outer surface of tube 24 to assist the sockets in locating the tube in properly centered position.

At its underside, bracket 45 carries a connector part 66, having the cup shaped hollow axial sectional configuration illustrated in FIG. 2, and secured rigidly to the bracket by screws 67 extending upwardly through mounting ears 68 on part 66. The bottom horizontal wall 69 of part 66 rigidly carries an internally threaded insert 70 which is connectable to the upper end of the previously discussed tube 14 to secure assembly 13 thereto. As seen in FIG. 5, the diameter of the interior of the upper portion of part 66 is great enough to allow cord 12 to pass upwardly from tube 14 through the interior of part 66 and past bracket 45 at a location between the inner ends of two of its arms 50 and 59 to connect to the input side of ballast 32, with the output from the ballast being connected appropriately to sockets 46, and to corresponding sockets 46a at the upper ends of the fluorescent tubes.

The top mounting structure 22 is very similar to lower structure 23, though inverted with respect thereto. In particular, top structure 22 includes a bracket 45a which is identical with bracket 45, (except that its central insert 47a is preferably unthreaded), and two sockets 46a which are identical with sockets 46. The upper end 28 of tube 26 extends through bracket 45a and its insert 47a, and is locked in fixed position relative thereto by an upper nut 48a which is threadedly connected to tube 26 and tightenable downwardly against a lock washer 49a, in a relation clamping tube 24 between the upper and lower brackets as shown. The top mounting portion 18 of the shade 17 may include the usual radially extending circularly spaced wires connected to a central annular hub ring 71 which is received about the upper end of tube 26, and tightened downwardly against nut 48a by the internally threaded finial 19.

Connected into the electrical supply to ballast 28, there is of course provided a conventional on-off switch, which is not shown in the drawings. When that switch is turned on, and the lamp is in use, current is fed through ballast 28 and sockets 46 and 46a to the upper and lower ends of lamps 25 to illuminate them. Energy lost in the ballast, which unless carried away would tend to raise the temperature of the ballast excessively, is dissipated by creation of an updraft of air through the interior of tube 15 past the outside of the ballast. This air enters the lower end of the tube by passage between arms 50 and 59 of bottom bracket 45, then flows upwardly through the annular space 44 within tube 24 and about the centerpost structure and its ballast portion and then exits from the interior of tube 25 through the spaces provided between the forearms of upper bracket 45a. This continuous circulation of air thus maintains the entire structure very cool and in proper operating condition.

When one of the tubes 25 burns out, it may be removed from sockets 46 and 46a by turning the tube about its individual axis 58 to a position in which the end contact prongs 72 of the tube are aligned with radially extending removal slots 73 formed in the sockets (see FIG. 5), and then pulling the tube laterally from the sockets (radially outwardly with respect to main axis 21 of the device). The replacement tube can be inserted into the mounted position with respect to the sockets by reverse motion radially inwardly, and by then turning the lamp about its axis 58 to electrically and mechanically connect the end prongs to the two sockets.

Figure 8:
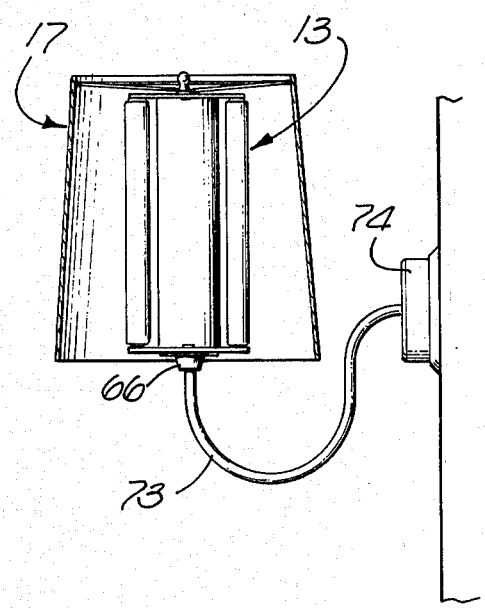
FIG. 8 shows a light unit embodying the invention as employed in a wall fixture.

FIG. 8 shows an arrangement in which the fluorescent assembly 13 of FIG. 1 and its carried shade 17 are mounted to a support tube 73 projecting from a wall mounted bracket element 74 in lieu of the table lamp base 11 of FIG. 1. The upper end of tube 73 may be threadedly connected to part 66 in the same manner that tube 14 of the first form of the invention was connected thereto.

Figure 9:
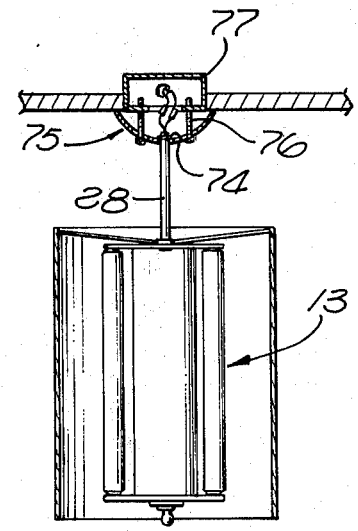
FIG. 9 shows the unit when employed as a ceiling fixture.

FIG. 9 shows another arrangement in which the light unit 13 is supported from its upper end, rather than its lower end, and specifically has its upwardly projecting externally threaded tube end 28 connected by a nut 74 to a decorative canopy 75, which is in turn secured by screws 76 to a ceiling mounted electrical box 77. In this instance, the wires to ballast 32 can extend downwardly through the threaded tube whose upper end is designated 28 in FIG. 9. In both FIG. 8 and FIG. 9 the same updraft of air through the interior of tube 24 and about the centerpost structure serves to maintain the ballast in cooled condition at all times.

While certain specific embodiments of the present invention have been disclosed as typical, the invention is of course not limited to these particular forms, but rather is applicable broadly to all such variations as fall within the scope of the appended claims.

I claim:

1. A lighting unit comprising:
    a vertically extending centerpost structure;
    two vertically spaced top and bottom structures connected to upper and lower portions respectively of said centerpost structure and interconnected thereby and projecting laterally therefrom; and
    a generally vertically extending tube disposed about said centerpost structure in spaced relation thereto and engaged and located at its upper and lower ends by said top and bottom structures respectively;
    said top and bottom structures extending laterally from said centerpost structure to the location of said tube and including lamp mounting electrical sockets projecting laterally outwardly beyond the tube to positions for mounting a plurality of generally vertical fluorescent lamps at the outside of said tube and at circularly spaced locations thereabout;
    said centerpost structure including at least one fluorescent lamp electrical ballast unit connected to the rest of the centerpost structure and located vertically between said top and bottom structures and within said tube with an air circulation space provided at the outside of the ballast unit and between it and said tube;
    said top and bottom structures both being open to air flow upwardly therepast at locations radially between said centerpost structure and said tube in a relation providing a continuous upflow path through which circulating air may flow first upwardly past said bottom structure, then upwardly within said tube and about said centerpost structure and said ballast unit to cool the latter, and then upwardly past said top structure and into the atmosphere.

2. A lighting unit as recited in claim 1, in which said centerpost structure has upper and lower portions which are connected to said top and bottom structures respectively and which are connected to different portions of said ballast unit and interconnected only by said ballast unit.

3. A lighting unit as recited in claim 1, in which said centerpost structure includes two upper and lower tubes connected to said top and bottom structures respectively with said ballast unit located vertically between and rigidly connected to said tubes in a relation interconnecting said two tubes only through the ballast unit.

4. A lighting unit as recited in claim 1, in which said centerpost structure includes two upper and lower vertically aligned tubes connected at first ends to said top and bottom structures respectively, with said ballast unit located vertically therebetween, said centerpost structure including two brackets connecting second ends of said two tubes to upper and lower ends respectively of said ballast unit in a relation connecting said two tubes together rigidly through said ballast unit.

5. A lighting unit as recited in claim 4, in which each of said brackets has a first portion disposed transversely of the axis of said tubes and containing an opening into which an end of a corresponding one of said two tubes is threadedly connectable, each of said brackets having a second portion turned vertically and connected to a vertically extending flange of said ballast unit.

6. A lighting unit as recited in claim 5, including two plates associated with said two brackets respectively, and screws for securing said plates to said vertically turned portions of said brackets with said flanges of the ballast clamped tightly between the plates and vertically turned portions.

7. A lighting unit as recited in claim 1, in which said bottom structure has a portion forming an internal thread centered about a vertical axis and adapted to be connected to an external thread of a lamp base.

8. A lighting unit as recited in claim 1, including a lamp base connected to said bottom structure to support it, and a lamp shade connected to said top structure.

9. A lighting unit as recited in claim 1, in which each of said top and bottom structures includes a bracket connected to said centerpost structure and having arms projecting outwardly therefrom and carrying said sockets.

10. A lighting unit as recited in claim 1, in which each of said top and bottom structures includes a bracket connected to said centerpost structure and having arms projecting outwardly therefrom and carrying said sockets, said sockets having horizontal portions projecting outwardly beyond said tube for attachment to said lamps, and having portions turned axially at the inner side of said tube.

11. A lighting unit as recited in claim 10, in which each of said brackets has additional arms spaced circularly from said first mentioned arms and projecting outwardly to the location of said tube and having locating lugs projecting axially to engage and locate the outer side of said tube.

12. A lighting unit as recited in claim 1, in which said top and bottom structures include brackets having arms projecting outwardly to the location of said tube and having lugs engaging the tube in a relation locating it against radial movement.

13. A lighting unit as recited in claim 1, in which each of said top and bottom structures includes a bracket having a central portion connected to said center post structure and having a first pair of arms projecting in diametrically opposite directions and carrying two of said sockets, each of said brackets having a second pair of arms projecting in diametrically opposite directions circularly intermediate said first arms with terminal lugs which are turned to engage the outer side of said tube, each of said sockets having a vertically turned insulative portion engageable with the inner side of said tube in locating relation.

14. A lighting unit as recited in claim 13, including a connector part secured to the underside of said bracket of said bottom structure and containing an internal thread connectable to an external thread of a lamp base tube to secure said unit thereto.

15. A lighting unit as recited in claim 14, in which said centerpost structure has an upper portion connected to said top structure and projecting upwardly therebeyond and adapted to mount a lamp shade and having external threads to which a shade retaining finial is connectable.

16. A lighting unit as recited in claim 14, in which said centerpost structure includes two vertically spaced top and bottom tubes connected to said top and bottom structures respectively in vertical alignment with said ballast unit connected vertically therebetween, and with said top and bottom tubes connected to upper and lower ends respectively of the ballast unit and interconnected only by said ballast unit.

17. A lighting unit as recited in claim 16, in which said top tube of said centerpost structure has a portion extending through said bracket of said top structure and about which a lamp shade is mountable and having external threads to which a finial for retaining the lamp shade is connectable.

* * * * *